United States Patent [19]
Stoffels et al.

[11] 4,084,180
[45] Apr. 11, 1978

[54] COLOR SPLITTING PRISM ASSEMBLY

[75] Inventors: Jacobus Stoffels; Adrianus Ambosius Johannes Bluekens; Petrus Jacobus, Maria Peters, all of Eindhoven, Netherlands

[73] Assignee: U.S. Philips Corporation, New York, N.Y.

[21] Appl. No.: 730,164

[22] Filed: Oct. 7, 1976

[30] Foreign Application Priority Data

Oct. 9, 1975 Netherlands .......................... 7511838

[51] Int. Cl.² ...................... H04N 9/09; G02B 27/14
[52] U.S. Cl. ........................................ 358/55; 350/173

[58] Field of Search .................. 358/50, 52, 55; 350/173

[56] References Cited

FOREIGN PATENT DOCUMENTS 1,206,461  9/1970  United Kingdom ................ 358/55

*Primary Examiner*—John C. Martin
*Attorney, Agent, or Firm*—Frank R. Trifari; Carl P. Steinhauser

[57] ABSTRACT

A beam splitting prism assembly in which at least some of the prisms are separated by an air gap, optionally connected at the edges through the beam splitting layers by means of strips of a thermo-plastic material.

3 Claims, 2 Drawing Figures

COLOR SPLITTING PRISM ASSEMBLY

The invention relates to a colour splitting prism assembly for colour television cameras which splits the incident light in such a camera into a plurality of beams of different spectral compositions intended for the pick-up tubes of the camera.

Essentially such a camera comprises three pick-up tubes for the colour components of the different spectral compositions, and a prism arrangement which ensures splitting which is a combination of a plurality of prisms, for example three in number.

The positioning of the prisms relative to one another must be done very accurately and furthermore some prisms must be separated from one another by means of a very narrow air gap, of, for example, 15 microns.

According to United Kingdom patent specification No. 1,206,461 a beam splitting prism assembly is proposed for a colour television camera including adjacent prism surfaces, in which the air gaps are adjusted by means of metallic wire which is compressed between said surfaces at the edges, said wire being capable when compressed of distorting and adhering to the surfaces. A suitable metal is indium which is applied in the form of an open ring, the ends of which are overlapped.

In practice this assembly was not very satisfactory. The glass-to-indium transitions entail annoying reflections.

The assemblies whose strength and resistivity against shocks are not very large are in the long run still further affected by atmospheric influences. The minimum spacing of the prisms having such an indium spacer is not less than 30 microns which is rather large in practice.

Finally the method of producing such a composite prism is not simple.

The invention now provides a beam splitting assembly consisting of glass prisms in which some of the prisms are separated by an air gap, the edges of the prism surfaces of this assembly are provided with a small strip at the glass surfaces bounding the air-gap, optionally through a beam splitting layer or layers of an adhering film of a thermoplastic material located thereon.

Besides polyethylene terephthalate, poly-carbonate or poly-acrylates, which are excellently suitable, the use of polyethylene is preferred. There are a number of varieties of polyethylene in which the degree of polymerisation and the branching of the chain differs. Known are "low density" and "high density" polyethylene which are both suitable.

The excellent bond obtained is also obtained by means of the beam splitting layer or layers which are obtained in the usual manner, which layers consist as a rule of chalcogenides such as $ZnS$, $TiO_2$ etc.

For adhering the film a continuous strip which is cut in one piece and which has a width of 2 to 3 mm is placed between the glass parts at a temperature of, for example, 150° C and the assembly is compressed at a pressure of approximately 15 g/mm². Starting from a 20 microns thick film the spacing between the glass parts is approximately 15 microns. The plane parallelism of the relevant surfaces in the assembly is already within a few microns so that a separate spacer can be dispensed with.

A method according to which the beam splitting prism assembly according to the invention may be produced and which will not be further explained herein, is described in application Ser. No. 729,818, filed Oct. 4, 1976.

The film between the prism elements is transparent. It is advantageous if this film is coloured black in order to further reduce the possibility of undesired reflections.

The invention will be described with reference to the accompanying drawing in which.

Figure 1:
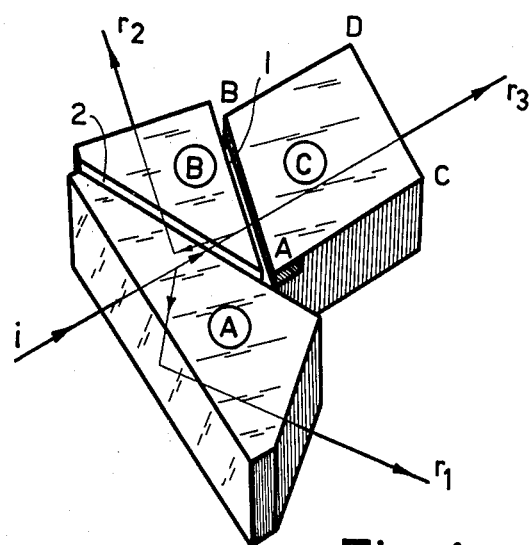
FIG. 1 shows a prism assembly according to the invention.
Figure 2:
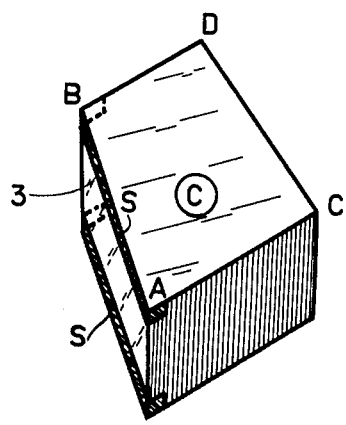
FIG. 2 shows a prism whose surface bounding an air-gap is provided with strips according to the invention.

As shown in FIG. 1, the prism assembly comprises prisms A, B and C separated by at least one air-gap, 1 and an interface 2. Prism C, as shown in more detail in FIG. 2 has a surface 3 bounding the air-gap 1 which is provided with a polyethylene strips S.

The ray paths through the prism assembly are shown in FIG. 1. An incident ray $i$ passes through prisms A and B and emerges from prism C as ray $r_3$. Part of the incident ray is reflected at the air-gaps 2 and emerges from prism B as $r_2$ while a portion of the incident ray is reflected at the air-gap 1 and emerges from A as $r_1$.

What is claimed is:

1. A beam splitting prism assembly comprising a plurality of prisms separated by an air gap, the edges of the prism surfaces bounding the air-gap being provided with a small strip at the glass surfaces, said strip comprising an adhering film of a thermoplastic material located thereon forming a beam splitting layer.

2. A prism assembly as claimed in claim 1, wherein the thermoplastic material is polyethylene film.

3. A prism assembly as claimed in claim 2, wherein the film is coloured black.

* * * * *